United States Patent
Schneider et al.

(10) Patent No.: US 10,684,915 B2
(45) Date of Patent: Jun. 16, 2020

(54) EFFICIENT PACKING OF COMPRESSED DATA IN STORAGE SYSTEM IMPLEMENTING DATA STRIPING

(71) Applicant: EMC IP Holding Company LLC, Hopkinton, MA (US)

(72) Inventors: Zvi Schneider, Tel Aviv (IL); Marcelo Taube, Tel Aviv (IL); Lior Kamran, Rishon LeZion (IL); Alex Soukhman, Raanana (IL); David Krakov, Ramat Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 16/044,957

(22) Filed: Jul. 25, 2018

(65) Prior Publication Data
US 2020/0034229 A1    Jan. 30, 2020

(51) Int. Cl.
*G06F 12/00*    (2006.01)
*G06F 11/10*    (2006.01)
(Continued)

(52) U.S. Cl.
CPC .......... *G06F 11/108* (2013.01); *G06F 3/061* (2013.01); *G06F 3/064* (2013.01); *G06F 3/0608* (2013.01);
(Continued)

(58) Field of Classification Search
CPC .... G06F 11/108; G06F 3/0608; G06F 3/0601; G06F 3/064; G06F 3/0664; G06F 3/0689; G06F 2211/1057; H04L 69/04
See application file for complete search history.

(56) References Cited

U.S. PATENT DOCUMENTS 7,444,464 B2    10/2008 Urmston et al.
8,095,726 B1    1/2012 O'Connell et al.
(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Prasith Thammavong
(74) *Attorney, Agent, or Firm* — Ryan, Mason & Lewis, LLP

(57) ABSTRACT

An apparatus comprises at least one processing device comprising a processor coupled to a memory. The processing device is configured to select a stripe column size for stripes of a data storage system, to determine a first compress block size for a first one of the stripes based on compressibility of data to be stored, to select a first prime number for computing parity blocks for the first stripe and a first number of sub-stripes for splitting stripe columns of the first stripe, to generate metadata specifying the first compress block size, the first prime number and the first number of sub-stripes for the first stripe, and to store data compressed using the first compress block size in the first stripe. The first prime number and first number of sub-stripes for the first stripe is different than a second prime number and second number of sub-stripes for a second stripe.

20 Claims, 10 Drawing Sheets

(51) Int. Cl.
*G06F 3/06* (2006.01)
*H04L 29/06* (2006.01)

(52) U.S. Cl.
CPC .......... *G06F 3/0664* (2013.01); *G06F 3/0689* (2013.01); *H04L 69/04* (2013.01); *G06F 2211/1057* (2013.01)

(56) References Cited

U.S. PATENT DOCUMENTS

| | | | |
|---|---|---|---|
| 8,214,612 | B1 | 7/2012 | Natanzon |
| 8,335,966 | B1* | 12/2012 | Lary ................... G06F 11/1076 714/6.24 |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1* | 3/2017 | Meiri ................... G06F 11/1092 |
| 9,716,754 | B2 | 7/2017 | Swift |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |
| 2020/0004630 | A1* | 1/2020 | Jaquette ................... G06F 3/064 |
| 2020/0004631 | A1* | 1/2020 | Jaquette ................... G06F 3/064 |
| 2020/0034231 | A1* | 1/2020 | Schneider ............... G06F 3/064 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)." White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

| D0 | D1 | D2 | D3 | D4 | P | Q |
|---|---|---|---|---|---|---|
| DATA | DATA | DATA | DATA | BLANK | ROW PARITY | DIAGONAL PARITY |
| DATA | DATA | DATA | BLANK | DATA | ROW PARITY | DIAGONAL PARITY |
| DATA | DATA | BLANK | DATA | DATA | ROW PARITY | DIAGONAL PARITY |
| DATA | BLANK | DATA | DATA | DATA | ROW PARITY | DIAGONAL PARITY |

FIG. 6

| SIZE | PRIME | # OF SUB-STRIPES | WASTE |
|---|---|---|---|
| 0.5 | 61 | 8 | 0 |
| 1 | 61 | 4 | 0 |
| 1.5 | 41 | 4 | 0 |
| 2 | 61 | 2 | 0 |
| 2.5 | 97 | 1 | 0 |
| 3 | 41 | 2 | 0 |
| 3.5 | 67 | 1 | 3.7 |
| 4 | 61 | 1 | 0 |
| 4.5 | 53 | 1 | 2.5 |
| 5 | 47 | 1 | 4.2 |
| 5.5 | 43 | 1 | 3.7 |
| 6 | 41 | 1 | 0 |
| 6.5 | 37 | 1 | 2.5 |
| 8 | 31 | 1 | 0 |

EFFICIENT PACKING OF COMPRESSED DATA IN STORAGE SYSTEM IMPLEMENTING DATA STRIPING

FIELD

The field relates generally to information processing systems, and more particularly to storage in information processing systems.

BACKGROUND

In many information processing systems, storage systems are key elements. Storage systems, such as block based storage systems, are designed to store and retrieve large amounts of data. To store a block of data, a data block address and data block content are provided. The data block address is also used to retrieve the data block content stored at the specified address. Some storage solutions rely on address-based mapping of data, as well as address-based functionality of a storage system's internal algorithms. This is natural, since computing applications typically rely on address-based mapping and identification of data that is stored and retrieved. However, another solution in which data, internally within a storage system, is mapped and managed based on its content instead of its address can provide various substantial advantages. For example, such a content based storage solution improves storage capacity efficiency since any duplicate block data will only occupy actual capacity of a single instance of that block. As another example, the content based storage solution can improve performance since duplicate block writes do not need to be executed internally in the storage system. Content based storage solutions, however, face various challenges.

SUMMARY

Illustrative embodiments provide techniques for the efficient packing of compressed data in a storage system, overcoming various constraints associated with storage of compressed data in storage systems that implement data striping across a plurality of storage devices. Through more efficient packing of compressed data, wasted storage space is reduced and associated improvements in storage system performance are provided.

In one embodiment, an apparatus comprises at least one processing device comprising a processor coupled to a memory. The processing device is configured to select, for a storage system implementing data striping across a plurality of storage devices, a stripe column size for stripes for each of the plurality of storage devices. The processing device is also configured to determine, for a first one of the stripes, a first compress block size based at least in part on compressibility of data to be stored in the first stripe. The processing device is further configured to select, based at least in part on the first compress block size, a first prime number for computing parity blocks for the first stripe and a first number of sub-stripes for splitting stripe columns of the first stripe on each of the plurality of storage devices. The processing device is further configured to generate, for the first stripe, metadata specifying the first compress block size, the first prime number and the first number of sub-stripes. The processing device is further configured to store, in the first stripe, data compressed using the first compress block size. At least one of the first compress block size, the first prime number and the first number of sub-stripes for the first stripe is different than at least one of a second compress block size, a second prime number and a second number of sub-stripes for a second one of the stripes of the storage system.

The processing device in some embodiments is implemented in a host device configured to communicate over a network with at least one storage system that implements the data striping. In other embodiments, the processing device is implemented in at least one storage system that implements the data striping. These are only examples, and alternative implementations are possible.

These and other illustrative embodiments include, without limitation, apparatus, systems, methods and processor-readable storage media.

BRIEF DESCRIPTION OF THE DRAWINGS

FIG. 6 is a table showing an alternate distribution of data blocks in the FIG. 4 RAID 6 array in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
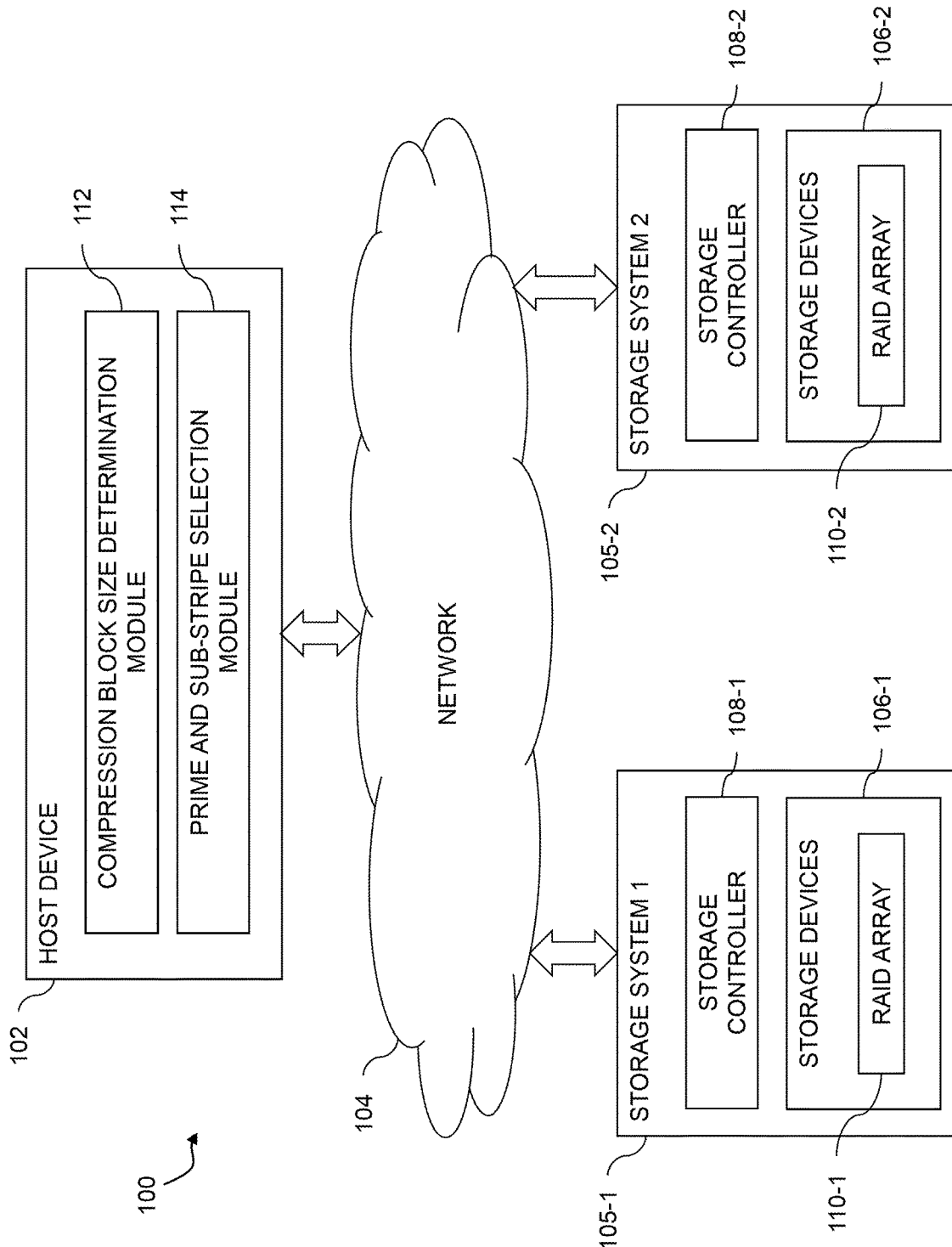
FIG. 1 is a block diagram of an information processing system comprising a host device configured with functionality for determining compression block size and selecting prime numbers and associated numbers of sub-stripes for efficient packing of compressed data in a storage system in an illustrative embodiment.

FIG. 1 shows an information processing system 100 configured in accordance with an illustrative embodiment. The information processing system 100 comprises a host device 102, which may comprise one of a plurality of host devices of a computer system. The host device 102 communicates over a network 104 with first and second storage systems 105-1 and 105-2, also denoted as Storage System 1 and Storage System 2, respectively. The storage systems 105-1 and 105-2 are collectively referred to herein as storage systems 105. The host device 102 and storage systems 105 may be part of an enterprise computing and storage system, a cloud-based system or another type of system.

The host device 102 and storage systems 105 illustratively comprise respective processing devices of one or more processing platforms. For example, the host device 102 and the storage systems 105 can each comprise one or more processing devices each having a processor and a memory, possibly implementing virtual machines and/or containers, although numerous other configurations are possible.

The host device 102 and the storage systems 105 can additionally or alternatively be part of cloud infrastructure such as an Amazon Web Services (AWS) system. Other examples of cloud-based systems that can be used to provide one or more of host device 102 and storage systems 105 include Google Cloud Platform (GCP) and Microsoft Azure.

The host device 102 is configured to write data to and read data from the storage systems 105. The host device 102 and the storage systems 105 may be implemented on a common processing platform, or on separate processing platforms. A wide variety of other types of host devices can be used in other embodiments.

The host device 102 in some embodiments illustratively provides compute services such as execution of one or more applications on behalf of each of one or more users associated with the host device 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage systems 105 are accessible to the host device over the network 104. The storage system 105-1 comprises a plurality of storage devices 106-1 and an associated storage controller 108-1. Similarly, the storage system 105-2 comprises a plurality of storage devices 106-2 and an associated storage controller 108-2. The storage devices 106-1 and 106-2 are collectively referred to herein as storage devices 106. The storage controllers 108-1 and 108-2 are collectively referred to as storage controllers 108.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, at least one of the storage systems 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement one or both of storage systems 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In the FIG. 1 embodiment, the storage devices 106 implement one or more Redundant Array of Independent Disks (RAID) arrays, denoted as RAID array 110-1 for storage devices 106-1 of storage system 105-1 and RAID array 110-2 for storage devices 106-2 of storage system 105-2. The RAID arrays 110-1 and 110-2 may collectively form a single RAID array 110, or may represent distinct RAID arrays. The RAID arrays 110 are assumed to store data in stripes across a plurality of SSDs provided by the storage devices 106. Each stripe may be further split into sub-stripes, as will be described in further detail below. The RAID array 110 is an example of what is more generally referred to herein as data striping across a plurality of storage devices in a storage system.

The host device 102 in the FIG. 1 embodiment includes a compression block size determination module 112 and a prime and sub-stripe selection module 114, which collectively provide logic and functionality for determining compression block size and selecting prime numbers and associated numbers of sub-stripes for efficient packing of compressed data in a storage systems that implements data striping across a plurality of storage devices (e.g., in RAID array 110 on storage devices 106). The modules 112 and 114 may provide functionality and logic for performing the process illustrated in the flow diagram of FIG. 3, described in further detail below. The host device 102 should also be understood to include additional modules and other components typically found in conventional implementations of computers, servers or other host devices, although such additional modules and other components are omitted from the figure for clarity and simplicity of illustration.

The host device 102 and storage systems 105 in the FIG. 1 embodiment are assumed to be implemented using at least one processing platform each comprising one or more processing devices each having a processor coupled to a memory. Such processing devices can illustratively include particular arrangements of compute, storage and network resources.

The host device 102 and the storage systems 105 may be implemented on respective distinct processing platforms, although numerous other arrangements are possible. For example, in some embodiments at least portions of the host device 102 and one or both of the storage systems 105 are implemented on the same processing platform. The storage systems 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage systems 105 to reside in different data centers. Numerous other distributed implementations of one or both of the host device 102 and the storage systems 105 are possible. Accordingly, the storage systems 105 can also be implemented in a distributed manner across multiple data centers.

Additional examples of processing platforms utilized to implement host devices and/or storage systems in illustrative embodiments will be described in more detail below in conjunction with FIGS. 9 and 10.

It is to be appreciated that these and other features of illustrative embodiments are presented by way of example only, and should not be construed as limiting in any way.

Accordingly, different numbers, types and arrangements of system components such as host device 102, network 104, storage systems 105, storage devices 106, storage controllers 108, and RAID arrays 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing functionality for determining compression block size and selecting prime numbers and associated numbers of sub-stripes for efficient packing of compressed data will be described below.

Figure 2:
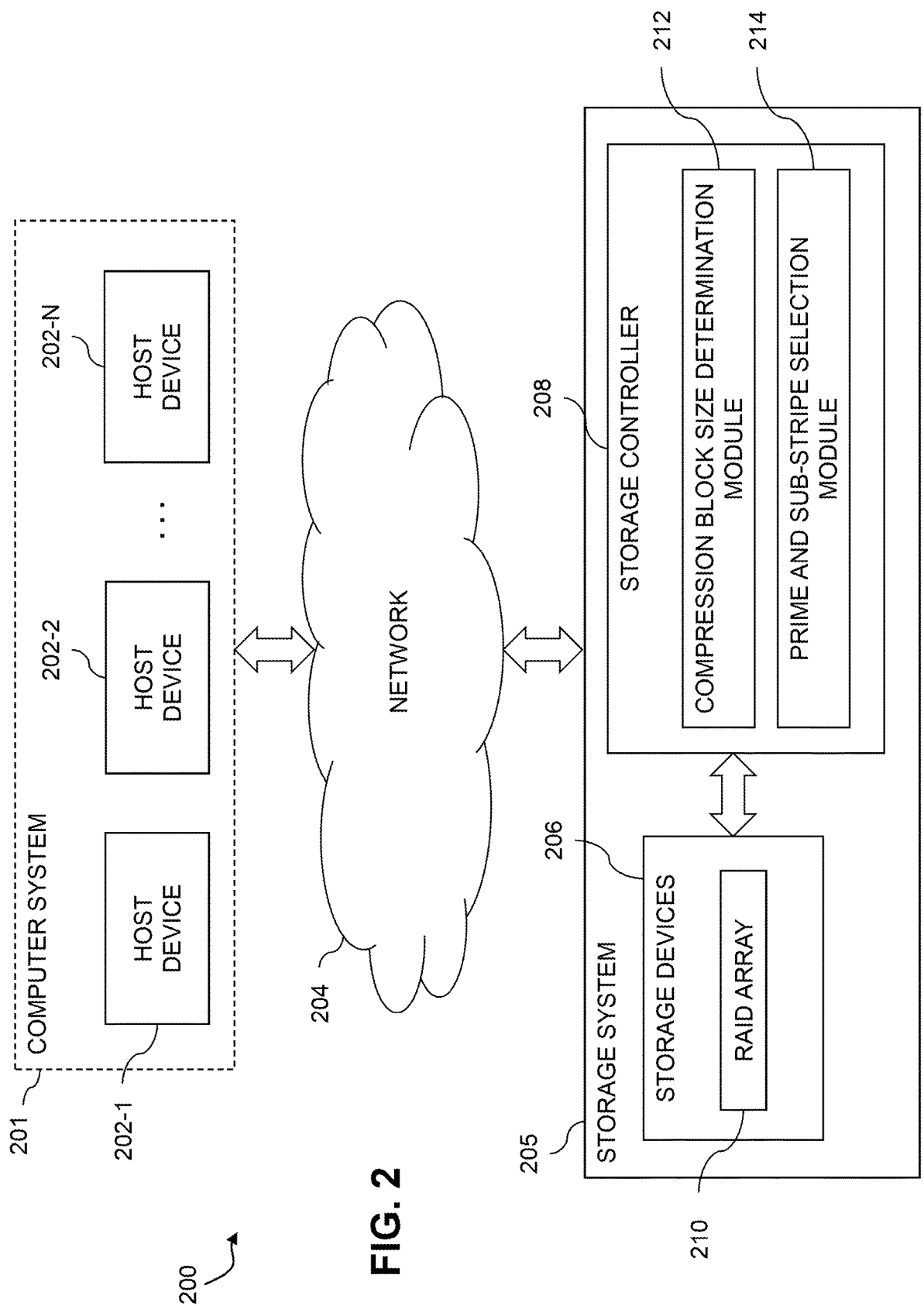
FIG. 2 is a block diagram of an information processing system comprising a storage system configured with functionality for determining compression block size and selecting prime numbers and associated numbers of sub-stripes for efficient packing of compressed data therein in an illustrative embodiment.

FIG. 2 shows an information processing system 200 configured in accordance with another illustrative embodiment. The information processing system 200 comprises a computer system 201 that includes host devices 202-1, 202-2, . . . 202-N. The host devices 202 communicate over a network 204 with a storage system 205. The computer system 201 is assumed to comprise an enterprise computer system, cloud-based computer system or other arrangement of multiple compute nodes associated with respective users. The host devices 202 of the computer system 201 in some embodiments illustratively provide compute services such as execution of one or more applications on behalf of each of one or more users associated with respective ones of the host devices 202.

Similar to the storage systems 105 of system 100, the storage system 205 comprises storage devices 206, storage controller 208 and RAID array 210. However, in this embodiment, the functionality for determining compression block size and selecting prime numbers and associated numbers of sub-stripes for efficient packing of compressed data in RAID array 210 is implemented in the storage system 205, rather than in one of the host devices 202. Accordingly, the storage controller 208 in this embodiment comprises modules 212 and 214, which are configured to operate in substantially the same manner as that described above for respective corresponding modules 112 and 114 of the host device 102 in the system 100.

In some embodiments, functionality for determining compression block size and selecting prime numbers and associated numbers of sub-stripes for efficient packing of compressed data in a storage system can be implemented partially in a host device and partially in the storage system. Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

The operation of the information processing systems 100 and 200 will now be described in further detail with reference to the flow diagram of the illustrative embodiment of FIG. 3. The process as shown includes steps 300 through 308, and is suitable for use in systems 100 and 200 but is more generally applicable to other types of information processing systems in which a host device or storage system is configured to determine compression block size and select prime numbers and associated numbers of sub-stripes for efficient packing of compressed data in a storage system implementing data striping across a plurality of storage devices. The steps are illustratively performed at least in part under the control of the compress block size determination module 112 and prime and sub-stripe selection module 114 in host device 102 of system 100 or in modules 212 and 214 in storage controller 208 of system 200.

Figure 3:
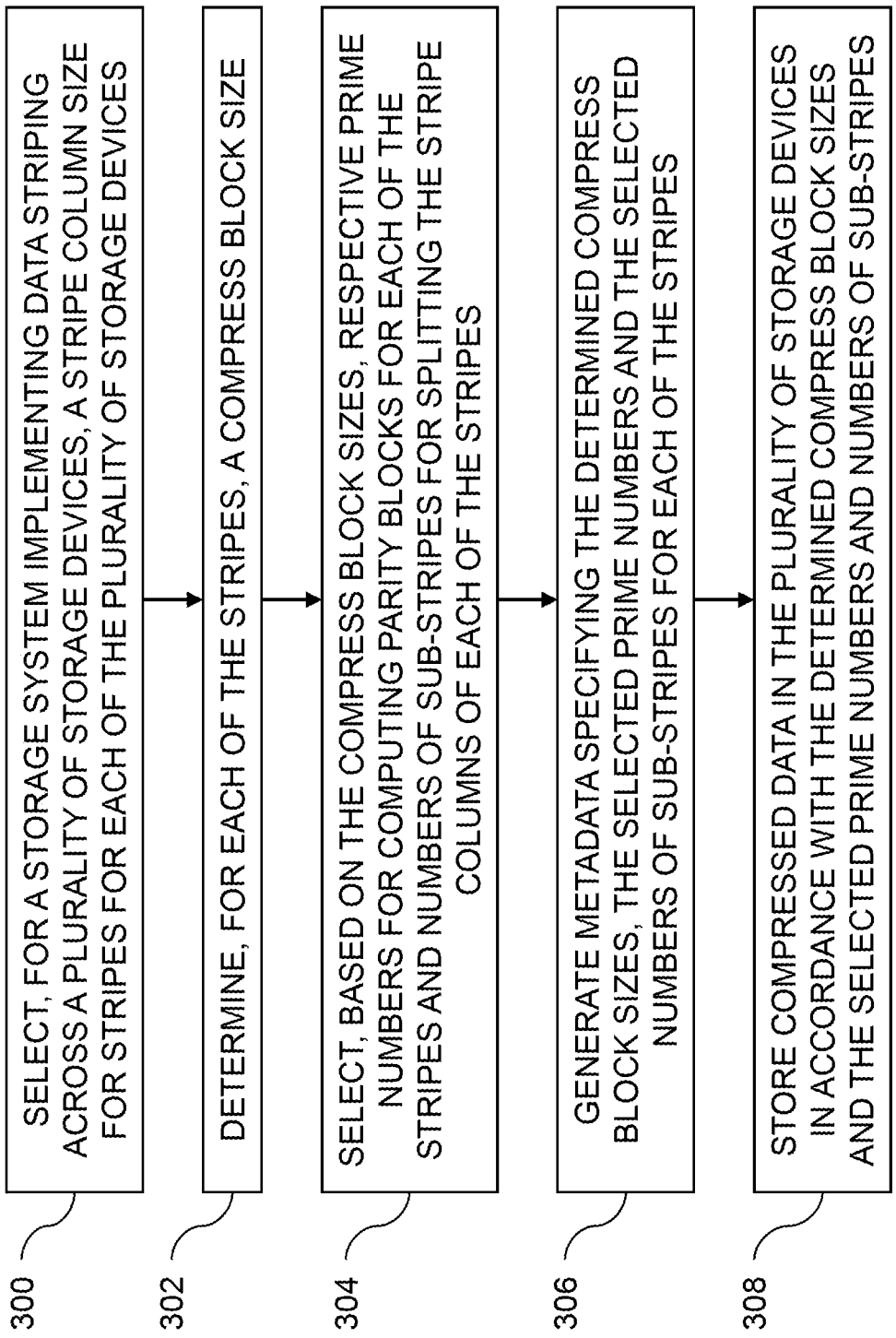
FIG. 3 is a flow diagram of a process for determining compression block size and selecting prime numbers and associated numbers of sub-stripes for efficient packing of compressed data in a storage system in an illustrative embodiment.

The FIG. 3 process begins with step 300, selecting, for a storage system implementing data striping across a plurality of storage devices, a stripe column size for stripes for each of the plurality of storage devices. The data striping in some embodiments is implemented utilizing RAID, such as via RAID arrays 110 on storage systems 105. In such embodiments, the number of data disks in the RAID storage system may comprise a prime number k, and a column of the RAID storage system comprises k−1 blocks. The storage devices of the RAID storage system may be SSDs. The RAID storage system may implement RAID 6 with the number of data disks being k and the number of parity disks being n, where n is greater than one (e.g., where n=2). Step 300 may involve selecting the stripe column size as a multiple of a designated block size. The multiple may be a prime number P minus 1. The prime number P may be the same as or different than the prime numbers selected for different ones of the stripes as will be described in further detail below with respect to step 304.

In step 302, compress block sizes are determined for each of the stripes. The compress block sizes may differ between the stripes, but the same compress block size is used for each storage device across that stripe (e.g., a same compress block size is used in each stripe column of a particular stripe, although different stripes may utilize different compress block sizes). The compress block sizes for the storage devices may be determined based at least in part on the compressibility of data that is to be stored in the different stripes. As mentioned above, the stripe column size selected in step 300 may be a multiple of a designated block size. The compress block size for at least one of the stripes may be a compress block size that divides this designated block size with remainder (e.g., for a designated block size of 8 kilobytes (KB), compress block sizes of 1.5K, 2.5K, etc. may be chosen, although the compress block size should not be larger than the designated block size).

In step 304, respective prime numbers and associated numbers of sub-stripes are selected for each of the stripes based on their corresponding compress block sizes determined in step 302. The prime number selected for a given stripe is used for computing parity blocks of the given stripe. The number of sub-stripes selected for the given stripe controls splitting of the stripe columns on each of the storage devices for the given stripe. To increase data packing efficiency, different prime numbers and associated numbers of sub-stripes may be selected for different stripes. It should be appreciated that in some cases, the same prime number may be used for stripes which utilize different compress block sizes. This may be achieved by varying the number of sub-stripes for such different stripes.

Metadata is generated in step 306 that specifies the compress block size, prime number and number of sub-stripes selected for each of the stripes. In step 308, compressed data is stored in the stripes of the storage system in accordance with the compress block sizes determined in step 302 and the prime numbers and associated numbers of sub-stripes selected in step 304.

As noted above, the stripe column size selected in step 300 may be a multiple of a designated block size, such as a (P−1) multiple of the designated block size where P is a prime number. The prime numbers selected in step 306 may differ from the prime number P. In some embodiments, the prime numbers and associated numbers of sub-stripes are selected to reduce waste associated with storing compressed data or pages. For example, a value of the prime number selected for a given stripe may be selected to reduce a difference between: (i) the selected stripe column size; and (ii) the compress block size multiplied by the selected number of stripes multiplied by the prime number selected for the given stripe. In some cases, the same prime number but different associated numbers of sub-stripes are selected for at least two of the stripes.

In some cases, the prime number selected for a particular stripe may be greater than a number of the plurality of storage devices in the storage system that store data blocks for that stripe. To handle such situations, the parity blocks for the stripe may be computed by assuming or setting a set of virtual storage devices with pages storing designated predetermined values (e.g., zero pages). The particular number of virtual storage devices in the set may be equal to the difference between the prime number selected for that stripe and the number of storage devices in the storage system which store data blocks for that stripe.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for determining compression block size and selecting prime numbers and associated numbers of sub-stripes for efficient packing of compressed data in a storage system implementing data striping across a plurality of storage devices. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems or for different RAID arrays or other data striping schemes on a particular storage system or systems.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 208 that is configured to control performance of one or more steps of the FIG. 3 process in its corresponding system 100 or 200 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host device 102 of system 100 or the storage controller 208 of system 200, as well as other system components, may be implemented at least in part using processing devices of such processing platforms. For example, in a distributed implementation of the storage controller 208, respective distributed modules of such a storage controller can be implemented in respective containers running on respective ones of the processing devices of a processing platform.

The term RAID, as used herein, is an umbrella term for computer data storage schemes that can divide and replicate data among multiple physical disk drives. The terms disks and drives will be used interchangeably henceforth. The physical disks are said to be in a RAID array, which is accessed by an operating system as one single disk. The different schemes or architectures are named by the word RAID followed by a number (e.g., RAID 0, RAID 1, etc.). Each scheme provides a different balance between the goals of increasing data reliability and increasing input/output performance.

The RAID 6 scheme was developed to provide functionality for recovering from multiple disk failure (e.g., similar to RAID 1.3) with high utilization rates (e.g., comparable to RAID 4 and 5) that avoids system bottlenecks. RAID 6 uses an N+2 parity scheme, which allows failure of two disks, where N is the number of disks in the array. RAID 6 defines block-level striping with double distributed parity and provides fault tolerance of two drive failures, so that the array continues to operate with up to two failed drives, irrespective of which two drives fail.

There are various implementations of RAID 6, which may use varying coding schemes. As the term is used herein, RAID 6 is defined as any N+2 coding scheme which tolerates double disk failure, while user data is kept in the clear. This additional requirement assures that user reads are not affected by the RAID scheme under normal system operation. Examples of RAID 6 schemes include those that utilize the Reed Solomon error correction code and those that utilize parity bits, such as those wherein N data disks are supported by two redundancy disks each holding a different parity bit. It should be noted that if all parity bits are on the same two disks, then the performance may be subject to bottlenecks. This can be solved by use of distributed parity stripes over N+2 disks similar to that specified in RAID 5. Examples of coding schemes based on parity calculations of rows and diagonals in a matrix of blocks include Even/Odd and Row Diagonal Parity (RDP). Both of these schemes utilize a first parity disk "P" that holds the parities of rows of blocks as well as a second parity disk "Q" that contains blocks that hold the parity of diagonals of data blocks. In both schemes, it is advantageous to work with a block size that is smaller than the native page size. For example, the native page size may be 4 KB, while the block size is 1 KB. Each stripe may thus contain four rows, and thus the four blocks present on each disk form a single native page. It is assumed that pages are read and written using a single disk operation.

Figure 4:
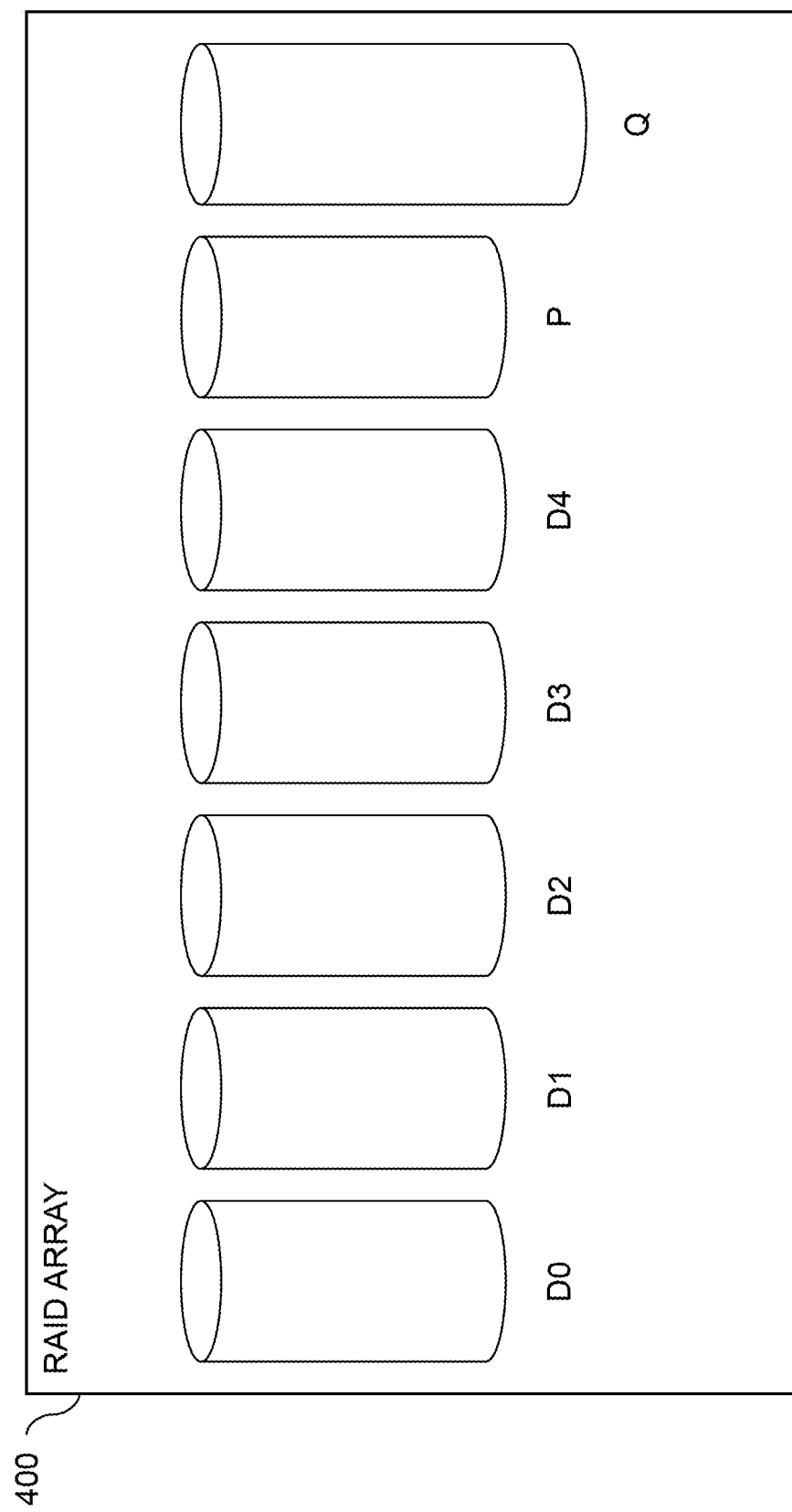
FIG. 4 is a block diagram illustrating a RAID 6 array in an illustrative embodiment.

FIG. 4 shows a RAID array 400, which in this example includes five data disks denoted D0 through D4. A storage controller (e.g., such as storage controllers 108 or storage controller 208) is configured for writing initial data into the array 400, and for updating existing data in the array 400. The storage controller further provides functionality for recovering data after single or double disk failure.

Each of the disks in the array 400 stores a column of data blocks. The same data block in successive disks forms a row, which is to say the rows cross the disks. The data storage blocks are stored alongside parity data blocks in parity disks denoted P and Q, and the numbers of data blocks in the different columns or disks may be different. Row parity blocks are placed in a row parity column in disk P, and the diagonal parity data is placed in diagonal parity blocks in disk Q.

In the case of five data columns and four data rows, the number of diagonals is one greater than the number of rows. Thus, the diagonal parity column in disk Q includes one more block than the other columns for disks D0 through D4 and the row parity disk P. This is illustrated in FIG. 4 as Q is "taller" than D0 through D4 and P.

The number of data columns is a prime number, and the number of rows is one less than that prime number (e.g., in the FIG. 4 example the prime number is 5 corresponding to the five data disks D0 through D4). It should be noted that, in practice, the various columns are distributed over the available physical disks to avoid system bottlenecks.

Figure 5:
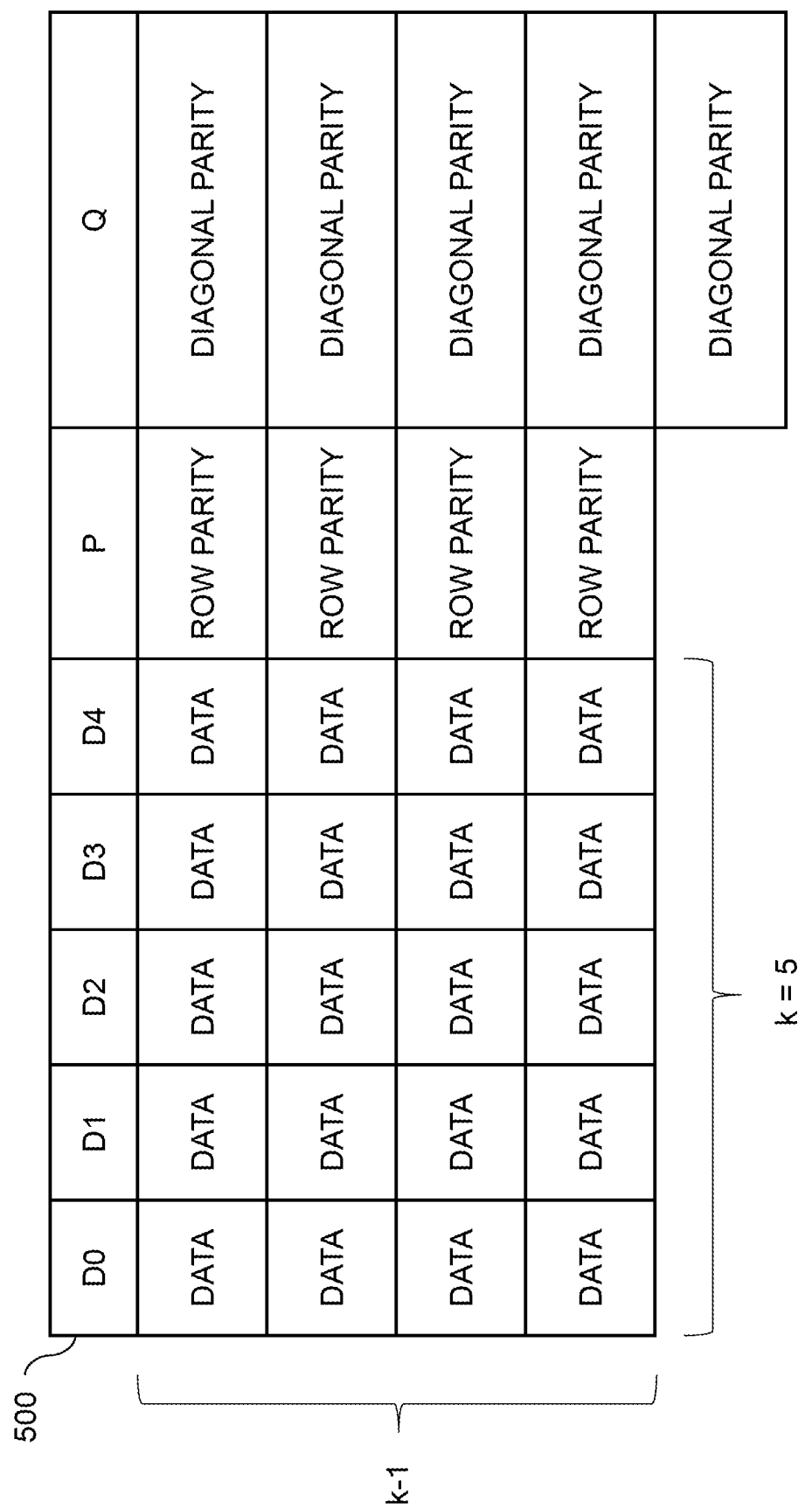
FIG. 5 is a table showing distribution of data blocks in the FIG. 4 RAID 6 array in an illustrative embodiment.

FIG. 5 shows a table 500 illustrating one example distribution of data blocks in the RAID array 400. In this case, there are k data disks, where k=5 is a prime number and there are five data columns corresponding to disks D0 through D4. There are four rows (e.g., k−1). The P column includes the same four rows as the data columns D0 through D4, but the Q column has an extra row.

Each stripe contains k (where k must be prime) data columns D0 through D4, and two parity columns P and Q. The stripe is composed of a quasi-matrix of blocks, which contains k−1 rows. Column P contains k−1 blocks, each providing the parity of the k data disk blocks in its row. The k by k−1 matrix made up of the blocks in the data columns includes k diagonals each of size k−1. Column Q, in contrast with the rest of the columns, contains k blocks and not k−1. Each of the k blocks in disk Q holds the parity of one of the diagonals. It should be noted that the ordering of blocks within each column may be arbitrary. Furthermore, the extra block in column Q may be placed in a data column which does not contain a data block in the diagonal of which this block is the parity. Also, some of the rows may be blank.

FIG. 6 shows a table 600 illustrating another example distribution of data blocks in the RAID array 400. In this case, there are k data disks, where k=5 is a prime number and there are five data columns corresponding to disks D0 through D4. There are four rows (e.g., k−1). The P column includes the same four rows as the data columns D0 through D4. The Q column also has four rows, since one of the diagonals in the k by k−1 matrix of the blocks in the data columns is left blank. An equivalent way of providing this effect is by setting one of the diagonals as a virtual diagonal whose content is fixed and equals zero. It should be noted that any number of diagonals may be set as virtual. It is thus a matter of efficient mapping between cells in the stripe and physical disk locations to eliminate further capacity overhead. The only constraint when performing such mappings is that cells in the same column must reside on the same disk, and vice versa.

It should be appreciated that there are various other ways to distribute data blocks in an array such as RAID array 400. For example, in some cases it may be desired to provide more than one row parity column, which results in higher capacity overhead but which allows for a faster rebuild after a single disk failure.

Additional details regarding the above-described techniques for storing data in RAID arrays are disclosed in U.S. Pat. No. 9,552,258, entitled "Method and System for Storing Data in RAID Memory Devices," which is incorporated by reference herein.

A general process for preparing for data compression in RAID stripes, such as stripes of RAID array 400, will now be described. Empty RAID stripes may be split in sub-stripes. Assuming, as an example, 4 KB pages, each stripe may be composed of L pages of data and M pages of parity, thus consuming a total of 4*(L+M) KB of storage, where M>1, L>1, and L equals the number of disks in the array minus M. M may be 2, such as in the RAID 6 array examples described above with respect to FIGS. 4-6. Such stripes are referred to herein as "1-stripes." The 1-stripes may be split into variable size sub-stripes, where the width of the sub-stripe divides the page size. For example, a 2-stripe may include 2L+2M sub-pages of 2 KB. This can be performed by taking a normal stripe (e.g., a 1-stripe), and splitting the stripe horizontally resulting in twice as many 2 KB sub-pages. Similarly, a 4-stripe includes 4L+4M sub-pages of 1 KB, an 8-stripe includes 8L+8M sub-pages of 512 bytes (B), etc. Sub-stripes or S-stripes with S=1, 2, 4, 8, etc. consume the same amount of storage and thus there is no unusable small pieces of space on disk that cannot be reused. Also, any type of S-stripe (e.g., 2-stripe, 3, stripe, etc.) can be converted to another type of S-stripe in place as needed.

Pages from a dirty queue (e.g., pages that have data that needs to be written to disk) may be scanned and tested for compressibility. Each page may be given a score S (e.g., 1, 2, 4, 8, etc.). This score means that the compressed page fits into a sub-page of 4 KB divided by S. For example, a page compressible by 80% gets a score S=4, meaning it will fit into ¼ of the normal 4 KB page. The process may search for S*L pages with the score S, and then store such pages into a corresponding S-stripe. Data that is read from a compressed sub-page may be uncompressed on the fly.

It should be noted that in some cases, data may be stored uncompressed. A background process may run in the storage controller for the RAID array 400 to compress such data if possible, by reading the uncompressed data may be read from the array, compressing the read data using the process described above, and then re-storing on the array.

Additional details regarding the above-described techniques for preparing for data compression in RAID stripes using sub-stripes are disclosed in U.S. Pat. No. 9,606,870, entitled "Data Reduction Techniques in a Flash-Based Key/Value Cluster Storage," which is incorporated by reference herein.

In certain RAID 6 scheme implementations, such as those disclosed in U.S. Pat. No. 9,552,258, a prime number is required to calculate parities of a stripe. Such RAID 6 implementations are unique in that they utilize an in place RAID update algorithm which does not require garbage collection unlike other possible RAID 6 write strategies. This prime number, however, also implies a restriction on the number of blocks in a stripe column and in the number of rows. As described above, for an array with k data disks (where k is a prime number), there are k−1 data rows. Put another way, if a column contains k−1 blocks, there can be at most k data disks in the RAID system to ensure compatibility with the in place RAID update algorithm that does not require garbage collection.

Data reduction may be supported using this RAID 6 scheme, while avoiding fragmentation of the disk space by fragmenting the space into stripes of equal size and assigning a type for each stripe where the type represents the block size as disclosed in U.S. Pat. No. 9,606,870. Given the above, however, there are limitations in that only block sizes that divide (without remainder) the basic system block size are supported. This is done by dividing each block into sub-pages, and treating all sub-pages with the same index as a sub-stripe or S-stripe that is RAID consistent and uses the same prime and RAID scheme as the original stripe. In a log structure write strategy system, packing may not be an issue since a stripe is fully overwritten in the write process and RAID is calculated in place.

Consider the following example. Assume that the block size is 8 KB, and the stripe size on the drives in the array is selected to be 30*8 KB=240 KB. The prime would thus be 31. This yields support for blocks of size 1 KB, 2 KB, 4 KB and 8 KB. If user data is compressed into 3 KB, it must be stored in at least a 4 KB block, thus wasting a minimum of 1 KB of capacity compared to an optimal data reduction.

Figure 7:
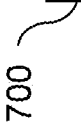
FIG. 7 is a table showing examples of primes which may be selected for different compression block sizes in an illustrative embodiment.

Embodiments improve the efficiency of data packing by using different prime numbers for different compress block sizes, and in this way may support any desired compress block size up to the block size (e.g., for an 8 KB block size, compress block sizes of 0.5 KB, 1 KB, 1.5 KB, 2 KB, . . . , 7 KB, 7.5 KB, 8 KB may be supported). To do this, embodiments hold a metadata entry for each stripe, while keeping the same stripe column size (e.g., the stripe size on each disk or drive in the array) across all stripes. For each stripe, a prime number is selected for a particular desired compress block size that optimally utilizes capacity. The prime number and its associated number of sub-stripes is applied to the entire stripe (e.g., each stripe column for each storage device in a particular stripe utilizes the selected prime number and its associated number of sub-stripes). The selection of primes for each compress block size may be performed such that:

$$\text{compress\_block\_size} \ast \# \text{ sub\_stripes} \ast (\text{prime}_{compress\_block\_size} - 1)$$

is as close as possible the stripe column size, where compress_block_size denotes the selected compress block size, # sub_stripes denotes the number of sub-stripes for the selected compress block size, and $\text{prime}_{compress\_block\_size}$ denotes the selected prime number. The waste is defined as:

$$\text{stripe\_column\_size} - \text{compress\_block\_size} \ast \# \text{ sub\_stripes} \ast (\text{prime}_{compress\_block\_size} - 1)$$

where stripe_column_size is the selected stripe column size. FIG. 7 shows a table 700 illustrating the prime numbers selected for stripe_column_size on each drive of the array equal to 240 KB. The table 700 illustrates the waste for each prime number and compress block size, where the waste is expressed as a percentage of the total capacity. Advantageously, such an approach permits for an in place stripe update scheme that reaches optimal data packing efficiency when data is compressed to various block sizes. The metadata for each stripe includes its associated compress block size, selected prime number and associated number of sub-stripes.

For example, to support a 2.5 KB block compress size (with the selected stripe column size of 240 KB), 97 is chosen as the prime number and there is one sub-stripe for each stripe column or each storage device in that stripe. There will thus be 96 rows in each stripe column with a basic block size of 2.5 KB (e.g., 96*2.5 KB=240 KB, the selected stripe column size). Each storage device in the given stripe will have this same prime number configuration. For example, assume the 2.5 KB block compress size is selected for a first stripe in the FIG. 4 RAID array 400. In such a scenario, the stripe column for the first stripe in disk D0 is split into 96 rows with a basic block size of 2.5 KB, the stripe column for the first stripe in disk D1 is split into 96 rows with a basic block size of 2.5 KB, etc. Each of the 96 rows has a corresponding row parity page in the parity disk P. As discussed above, the diagonal parity disk Q may include 97 entries as there are 97 diagonals. Even assuming that there are only five data disks, the parity arithmetic is built for the prime number P=97 selected for the 2.5 KB compress block size. To achieve this, zero pages are assumed for the non-existent data disks. Each diagonal has a parity entry in the Q disk, and there is one extra Q entry as noted elsewhere herein. There is thus zero wastage when writing pages compressed to 2.5 KB with the 240 KB stripe column size. In an arrangement wherein the block compress size must be a multiple of a designated block size (e.g., 8 KB), the 2.5 KB compressed page would be stored in a 4 KB page resulting in 1.5 KB waste.

In some embodiments, the storage system comprises an XtremIO™ storage array or other type of content addressable storage system suitably modified to incorporate functionality for determining compression block size and selecting prime numbers and associated numbers of sub-stripes for efficient packing of compressed data as disclosed herein.

An illustrative embodiment of such a content addressable storage system will now be described with reference to FIG. 8. In this embodiment, a content addressable storage system 805 comprises a plurality of storage devices 806 and an associated storage controller 808. The content addressable storage system 805 may be viewed as a particular implementation of the storage system 205, and accordingly is assumed to be coupled to host devices 202 of computer system 201 via network 204 within information processing system 200.

The storage controller 808 in the present embodiment is configured to implement functionality for determining compression block size and selecting prime numbers and associated numbers of sub-stripes for efficient packing of compressed data of the type previously described in conjunction with FIGS. 1 through 7 for determining compression block size and selecting prime numbers and associated numbers of sub-stripes for efficient packing of compressed data in RAID array 810.

The storage controller 808 includes distributed modules 812 and 814, which are configured to operate in a manner similar to that described above for respective corresponding modules 112, 212 and 114, 214.

Figure 8:
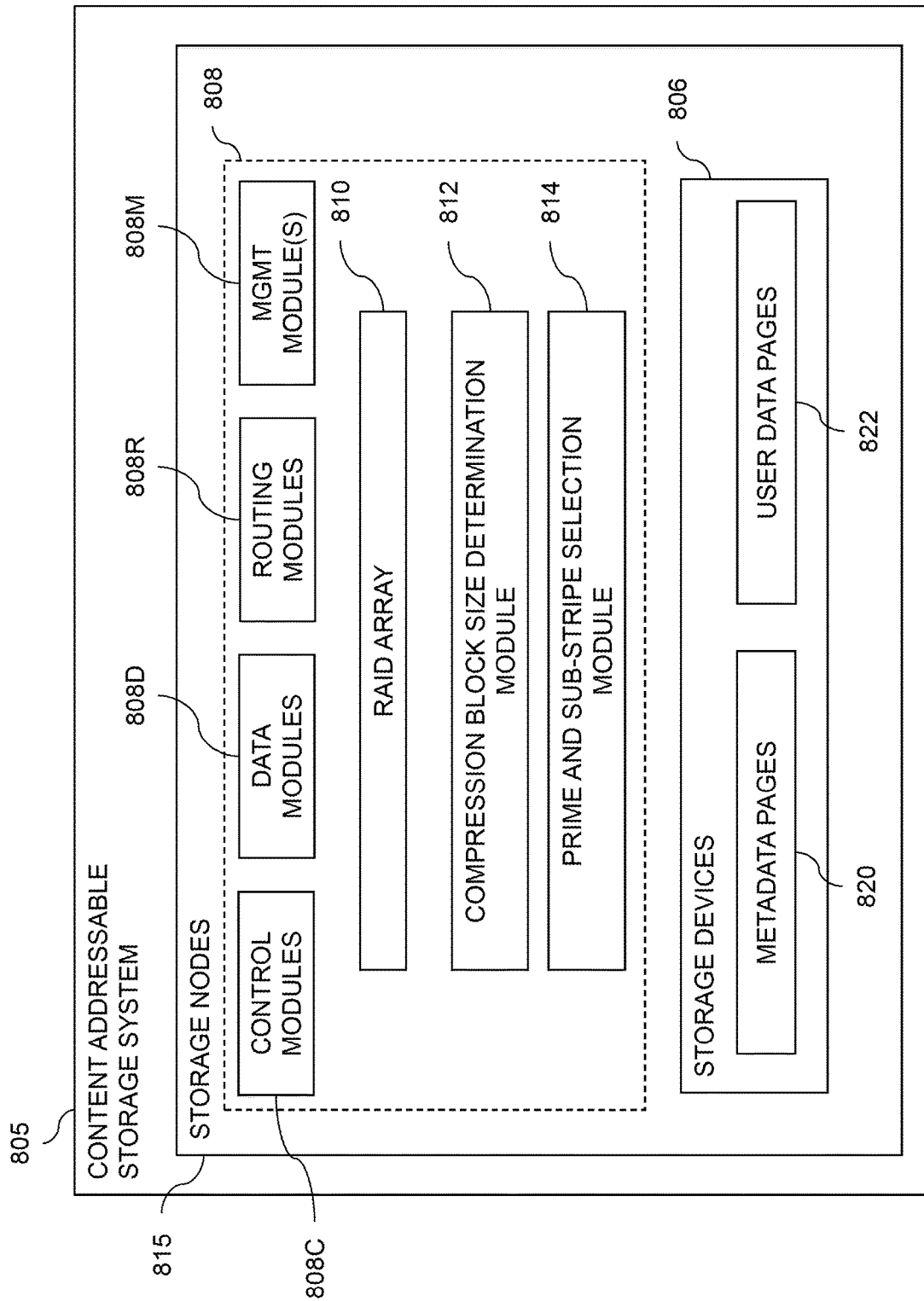
FIG. 8 shows a content addressable storage system having a distributed storage controller configured with functionality for determining compression block size and selecting prime numbers and associated numbers of sub-stripes for efficient packing of compressed data in a storage system in an illustrative embodiment.

The content addressable storage system 805 in the FIG. 8 embodiment is implemented as at least a portion of a clustered storage system and includes a plurality of storage nodes 815 each comprising a corresponding subset of the storage devices 806. Other clustered storage system arrangements comprising multiple storage nodes can be used in other embodiments. A given clustered storage system may include not only storage nodes 815 but also additional storage nodes coupled to network 204. Alternatively, such additional storage nodes may be part of another clustered storage system of the system 200. Each of the storage nodes 815 of the storage system 805 is assumed to be implemented using at least one processing device comprising a processor coupled to a memory.

The storage controller 808 of the content addressable storage system 805 is implemented in a distributed manner so as to comprise a plurality of distributed storage controller components implemented on respective ones of the storage nodes 815. The storage controller 808 is therefore an example of what is more generally referred to herein as a "distributed storage controller." In subsequent description herein, the storage controller 808 may be more particularly referred to as a distributed storage controller.

Each of the storage nodes 815 in this embodiment further comprises a set of processing modules configured to communicate over one or more networks with corresponding sets of processing modules on other ones of the storage nodes 815. The sets of processing modules of the storage nodes 815 collectively comprise at least a portion of the distributed storage controller 808 of the content addressable storage system 805.

The modules of the distributed storage controller 808 in the present embodiment more particularly comprise different sets of processing modules implemented on each of the storage nodes 815. The set of processing modules of each of the storage nodes 815 comprises at least a control module 808C, a data module 808D and a routing module 808R. The distributed storage controller 808 further comprises one or more management ("MGMT") modules 808M. For example, only a single one of the storage nodes 815 may include a management module 808M. It is also possible that management modules 808M may be implemented on each of at least a subset of the storage nodes 815.

Each of the storage nodes 815 of the storage system 805 therefore comprises a set of processing modules configured to communicate over one or more networks with corresponding sets of processing modules on other ones of the storage nodes. A given such set of processing modules implemented on a particular storage node illustratively includes at least one control module 808C, at least one data module 808D and at least one routing module 808R, and possibly a management module 808M. These sets of processing modules of the storage nodes collectively comprise at least a portion of the distributed storage controller 808.

Communication links may be established between the various processing modules of the distributed storage controller 808 using well-known communication protocols such as IP, Transmission Control Protocol (TCP), and remote direct memory access (RDMA). For example, respective sets of IP links used in data transfer and corresponding messaging could be associated with respective different ones of the routing modules 808R.

Although shown as separate modules of the distributed storage controller 808, the modules 812 and 814 in the present embodiment are assumed to be distributed at least in part over at least a subset of the other modules 808C, 808D, 808R and 808M of the storage controller 808. Accordingly, at least portions of the functionality of the modules 812 and 814 may be implemented in one or more of the other modules of the storage controller 808. In other embodiments, the modules 812 and 814 may be implemented as stand-alone modules of the storage controller 808.

The storage devices 806 are configured to store metadata pages 820 and user data pages 822, and may also store additional information not explicitly shown such as checkpoints and write journals. The metadata pages 820 and the user data pages 822 are illustratively stored in respective designated metadata and user data areas of the storage devices 806. Accordingly, metadata pages 820 and user data pages 822 may be viewed as corresponding to respective designated metadata and user data areas of the storage devices 806.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 820 and the user data pages 822.

The user data pages 822 are part of a plurality of logical units (LUNs) configured to store files, blocks, objects or other arrangements of data, each also generally referred to herein as a "data item," on behalf of users associated with host devices 202. Each such LUN may comprise particular ones of the above-noted pages of the user data area. The user data stored in the user data pages 822 can include any type of user data that may be utilized in the system 200. The term "user data" herein is therefore also intended to be broadly construed.

The content addressable storage system 805 in the embodiment of FIG. 8 is configured to generate hash metadata providing a mapping between content-based digests of respective ones of the user data pages 822 and corresponding physical locations of those pages in the user data area. Content-based digests generating using hash functions are also referred to herein as "hash digests." The hash metadata generated by the content addressable storage system 805 is illustratively stored as metadata pages 820 in the metadata area. The generation and storage of the hash metadata is assumed to be performed under the control of the storage controller 808.

Each of the metadata pages 820 characterizes a plurality of the user data pages 822. For example, a given set of user data pages representing a portion of the user data pages 822 illustratively comprises a plurality of user data pages denoted User Data Page 1, User Data Page 2, . . . User Data Page n. It should be noted that usage of the variable n in this user data page context is unrelated to its usage elsewhere herein.

Each of the user data pages 822 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 806.

Each of the metadata pages 820 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 820 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 805 is illustratively distributed among the control modules 808C.

The functionality provided by modules 812 and 814 in this embodiment is assumed to be distributed across multiple distributed processing modules, including at least a subset of the processing modules 808C, 808D, 808R and 808M of the distributed storage controller 808.

For example, the management module 808M of the storage controller 808 may include logic that engages corresponding logic instances in all of the control modules 808C and routing modules 808R in order to implement processes for determining compression block size and selecting prime numbers and associated numbers of sub-stripes for efficient packing of compressed data.

In some embodiments, the content addressable storage system 805 comprises an XtremIO™ storage array suitably modified to incorporate techniques for determining compression block size and selecting prime numbers and associated numbers of sub-stripes for efficient packing of compressed data as disclosed herein.

In arrangements of this type, the control modules 808C, data modules 808D and routing modules 808R of the distributed storage controller 808 illustratively comprise respective C-modules, D-modules and R-modules of the XtremIO™ storage array. The one or more management modules 808M of the distributed storage controller 808 in such arrangements illustratively comprise a system-wide management module ("SYM module") of the XtremIO™ storage array, although other types and arrangements of system-wide management modules can be used in other embodiments. Accordingly, functionality for determining compression block size and selecting prime numbers and associated numbers of sub-stripes for efficient packing of compressed data in some embodiments is implemented under the control of at least one system-wide management module of the distributed storage controller 808, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 808C such that control of the slices within the storage controller 808 of the storage system 805 is substantially evenly distributed over the control modules 808C of the storage controller 808.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 805 each illustratively comprise one or more IO operations directing that at least one data item of the storage system 805 be written to in a particular manner. A given write request is illustratively received in the storage system 805 from a host device, illustratively one of the host devices 202. In some embodiments, a write request is received in the distributed storage controller 808 of the storage system 805, and directed from one processing module to another processing module of the distributed storage controller 808. For example, a received write request may be directed from a routing module 808R of the distributed storage controller 808 to a particular control module 808C of the distributed storage controller 808. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 815 communicate with one another over a high-speed internal network such as an InfiniBand network. The C-modules, D-modules and R-modules coordinate with one another to accomplish various IO processing tasks.

The write requests from the host devices identify particular data pages to be written in the storage system 805 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 805 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 805.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 806. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 805 correspond to respective physical blocks of a physical layer of the storage system 805. The user data pages of the logical layer are organized by LBA and have reference via respective content-based signatures to particular physical blocks of the physical layer.

Each of the physical blocks has an associated reference count that is maintained within the storage system 805. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 808C, 808D, 808R and 808M as shown in the FIG. 8 embodiment is presented by way of example only. Numerous alternative arrangements of processing modules of a distributed storage controller may be used to implement functionality for determining compression block size and selecting prime numbers and associated numbers of sub-stripes for efficient packing of compressed data in a clustered storage system in other embodiments.

Additional examples of content addressable storage functionality implemented in some embodiments by control modules 808C, data modules 808D, routing modules 808R and management module(s) 808M of distributed storage controller 808 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with functionality for determining compression block size and selecting prime numbers and associated numbers of sub-stripes can provide a number of significant advantages relative to conventional arrangements. For example, some embodiments provide techniques for the efficient packing of data by supporting any desired compress block size, thus reducing waste associated with storage of compressed data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for determining compression block size and selecting prime numbers and associated numbers of sub-stripes for efficient packing of compressed data will now be described in greater detail with reference to FIGS. 9 and 10. Although described in the context of system 100, these platforms may also be used to implement at least portions of other information processing systems in other embodiments.

Figure 9:
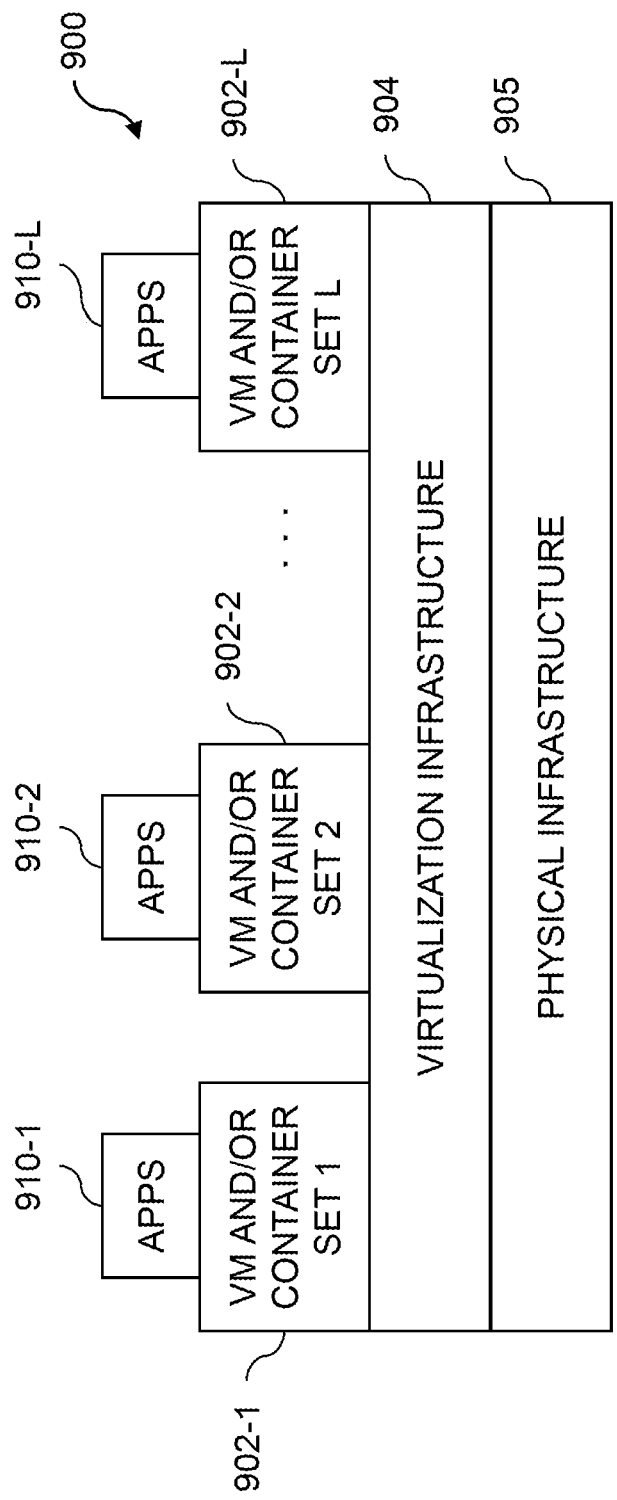
FIGS. 9 and 10 show examples of processing platforms that may be utilized to implement at least a portion of an information processing system in illustrative embodiments.
Figure 10:
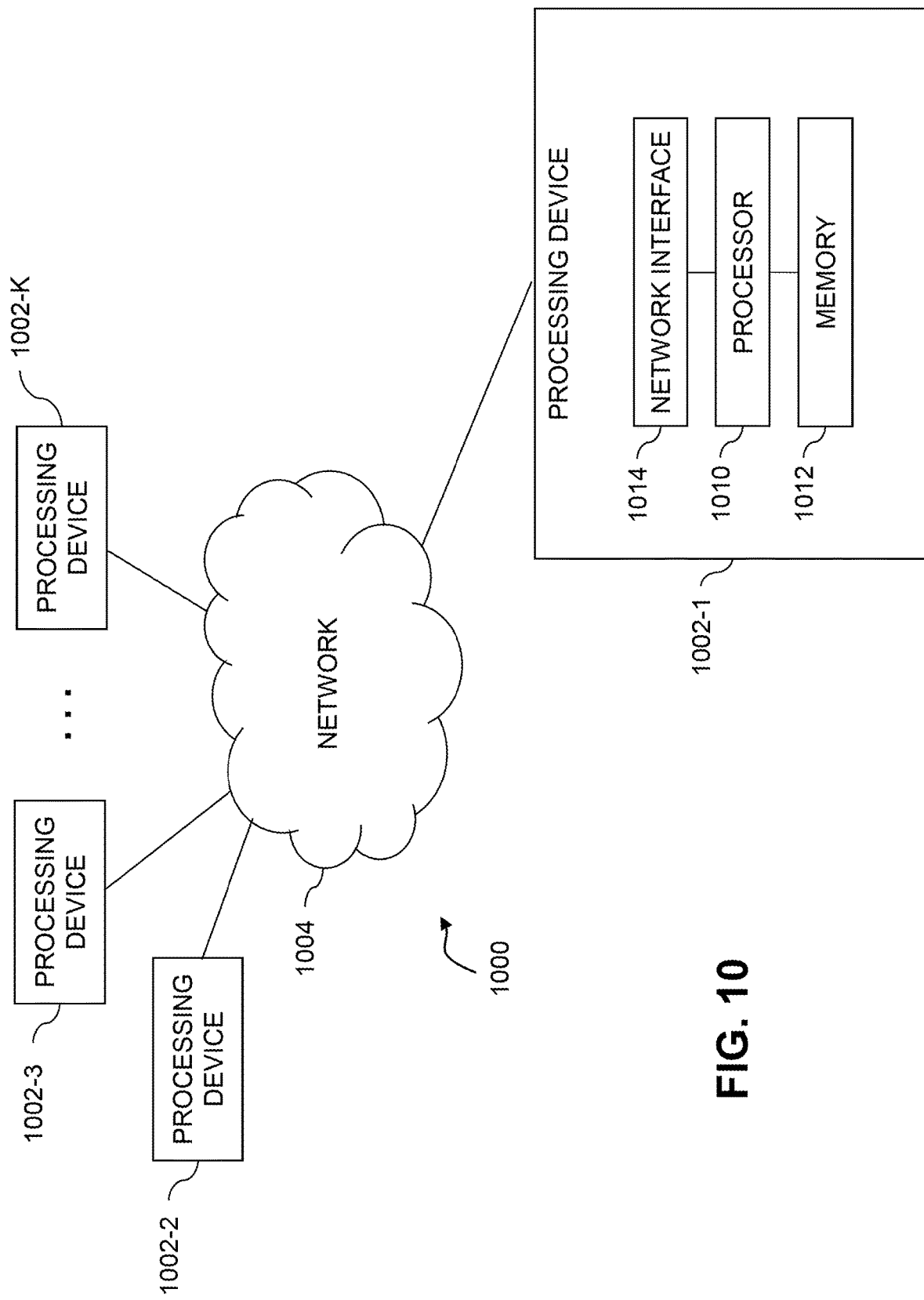

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide functionality for determining compression block size and selecting prime numbers and associated numbers of sub-stripes for efficient packing of compressed data of the type described above for one or more processes running on a given one of the VMs. For example, each of the VMs can implement such functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide functionality for determining compression block size and selecting prime numbers and associated numbers of sub-stripes for efficient packing of compressed data of the type described above for one or more processes running on different ones of the containers. For example, a container host device supporting multiple containers of one or more container sets can implement one or more instances of such functionality or logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for determining compression block size and selecting prime numbers and associated numbers of sub-stripes for efficient packing of compressed data as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, RAID arrays or other data striping, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the processing device being configured:
        to select, for a storage system implementing data striping across a plurality of storage devices, a stripe column size for stripes for each of the plurality of storage devices;
        to determine, for a first one of the stripes, a first compress block size based at least in part on compressibility of data to be stored in the first stripe;
        to select, based at least in part on the first compress block size, a first prime number for computing parity blocks for the first stripe and a first number of sub-stripes for splitting stripe columns of the first stripe on each of the plurality of storage devices;
        to generate, for the first stripe, metadata specifying the first compress block size, the first prime number and the first number of sub-stripes; and
        to store, in the first stripe, data compressed using the first compress block size;
    wherein at least one of the first compress block size, the first prime number and the first number of sub-stripes for the first stripe is different than at least one of a second compress block size, a second prime number and a second number of sub-stripes for a second one of the stripes of the storage system.

2. The apparatus of claim 1 wherein the storage system comprises a Redundant Array of Independent Disks (RAID) storage system.

3. The apparatus of claim 2 wherein a number of data disks in the RAID storage system comprises a prime number k, and wherein a column of the RAID storage system comprises k−1 blocks.

4. The apparatus of claim 2 wherein the plurality of storage devices comprise solid state drives (SSDs).

5. The apparatus of claim 2 wherein the RAID storage system implements RAID 6 with the number of data disks being k and the number of parity disks being n, where n is greater than one.

6. The apparatus of claim 1 wherein selecting the stripe column size comprises selecting the stripe column size as a multiple of a designated block size.

7. The apparatus of claim 6 wherein the first compress block size divides the designated block size with remainder.

8. The apparatus of claim 6 wherein the multiple of the designated block size comprises a (P−1) multiple of the designated block size where P is a prime number, and wherein the first prime number selected for the first stripe is different than P.

9. The apparatus of claim 1 wherein selecting the first prime number and the first number of sub-stripes comprises selecting a value of the first prime number to reduce a difference between: (i) the selected stripe column size; and (ii) the first compress block size multiplied by the first number of stripes multiplied by the first prime number.

10. The apparatus of claim 1 wherein the first prime number and the second prime number are the same, and wherein the first number of sub-stripes and the second number of sub-stripes are different.

11. The apparatus of claim 1 wherein when the first prime number is greater than a number of the plurality of storage devices in the storage system storing data blocks for the first stripe, parity blocks are computed utilizing a set of virtual storage devices that store pages with a designated predetermined value.

12. The apparatus of claim 11 wherein the designated predetermined value is zero.

13. The apparatus of claim 11 wherein a number of virtual storage devices in the set is equal to a difference between the first prime number and the number of storage devices in the storage system storing data blocks.

14. The apparatus of claim 1 wherein the first prime number is selected to reduce waste associated with storing compressed pages using the first compress block size in the selected stripe column size.

15. A method comprising:
   selecting, for a storage system implementing data striping across a plurality of storage devices, a stripe column size for stripes for each of the plurality of storage devices;
   determining, for a first one of the stripes, a first compress block size based at least in part on compressibility of data to be stored in the first stripe;
   selecting, based at least in part on the first compress block size, a first prime number for computing parity blocks for the first stripe and a first number of sub-stripes for splitting stripe columns of the first stripe on each of the plurality of storage devices;
   generating, for the first stripe, metadata specifying the first compress block size, the first prime number and the first number of sub-stripes; and
   storing, in the first stripe, data compressed using the first compress block size;
   wherein at least one of the first compress block size, the first prime number and the first number of sub-stripes for the first stripe is different than at least one of a second compress block size, a second prime number and a second number of sub-stripes for a second one of the stripes of the storage system; and
   wherein the method is implemented by at least one processing device comprising a processor coupled to a memory.

16. The method of claim 15 wherein selecting the first prime number and the first number of sub-stripes comprises selecting a value of the first prime number to reduce a difference between: (i) the selected stripe column size; and (ii) the first compress block size multiplied by the first number of stripes multiplied by the first prime number.

17. The method of claim 15 wherein selecting the stripe column size comprises selecting the stripe column size as a multiple of a designated block size, and wherein the first compress block size divides the designated block size with remainder.

18. A computer program product comprising a non-transitory processor-readable storage medium having stored therein program code of one or more software programs, wherein the program code when executed by at least one processing device causes said at least one processing device:
   to select, for a storage system implementing data striping across a plurality of storage devices, a stripe column size for stripes for each of the plurality of storage devices;
   to determine, for a first one of the stripes, a first compress block size based at least in part on compressibility of data to be stored in the first stripe;
   to select, based at least in part on the first compress block size, a first prime number for computing parity blocks for the first stripe and a first number of sub-stripes for splitting stripe columns of the first stripe on each of the plurality of storage devices;
   to generate, for the first stripe, metadata specifying the first compress block size, the first prime number and the first number of sub-stripes; and
   to store, in the first stripe, data compressed using the first compress block size;
   wherein at least one of the first compress block size, the first prime number and the first number of sub-stripes for the first stripe is different than at least one of a second compress block size, a second prime number and a second number of sub-stripes for a second one of the stripes of the storage system.

19. The computer program product of claim 18 wherein selecting the first prime number and the first number of sub-stripes comprises selecting a value of the first prime number to reduce a difference between: (i) the selected stripe column size; and (ii) the first compress block size multiplied by the first number of stripes multiplied by the first prime number.

20. The computer program product of claim 18 wherein selecting the stripe column size comprises selecting the stripe column size as a multiple of a designated block size, and wherein the first compress block size divides the designated block size with remainder.

* * * * *